Nov. 21, 1939.    D. D. ORMSBY    2,180,962
DRIVE AXLE ASSEMBLY
Filed April 27, 1936    7 Sheets-Sheet 2

Inventor:
Donald D. Ormsby
By
Att'ys

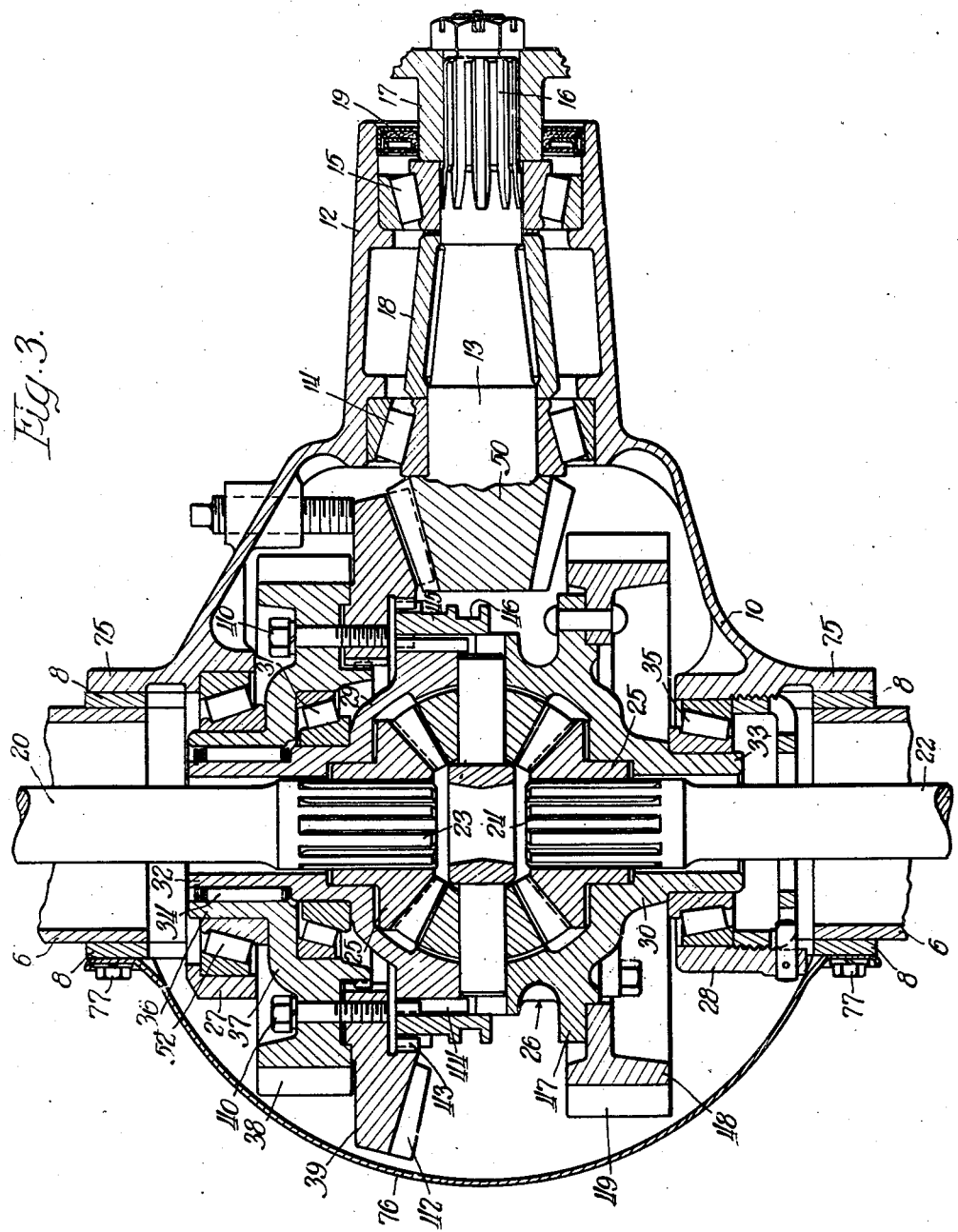

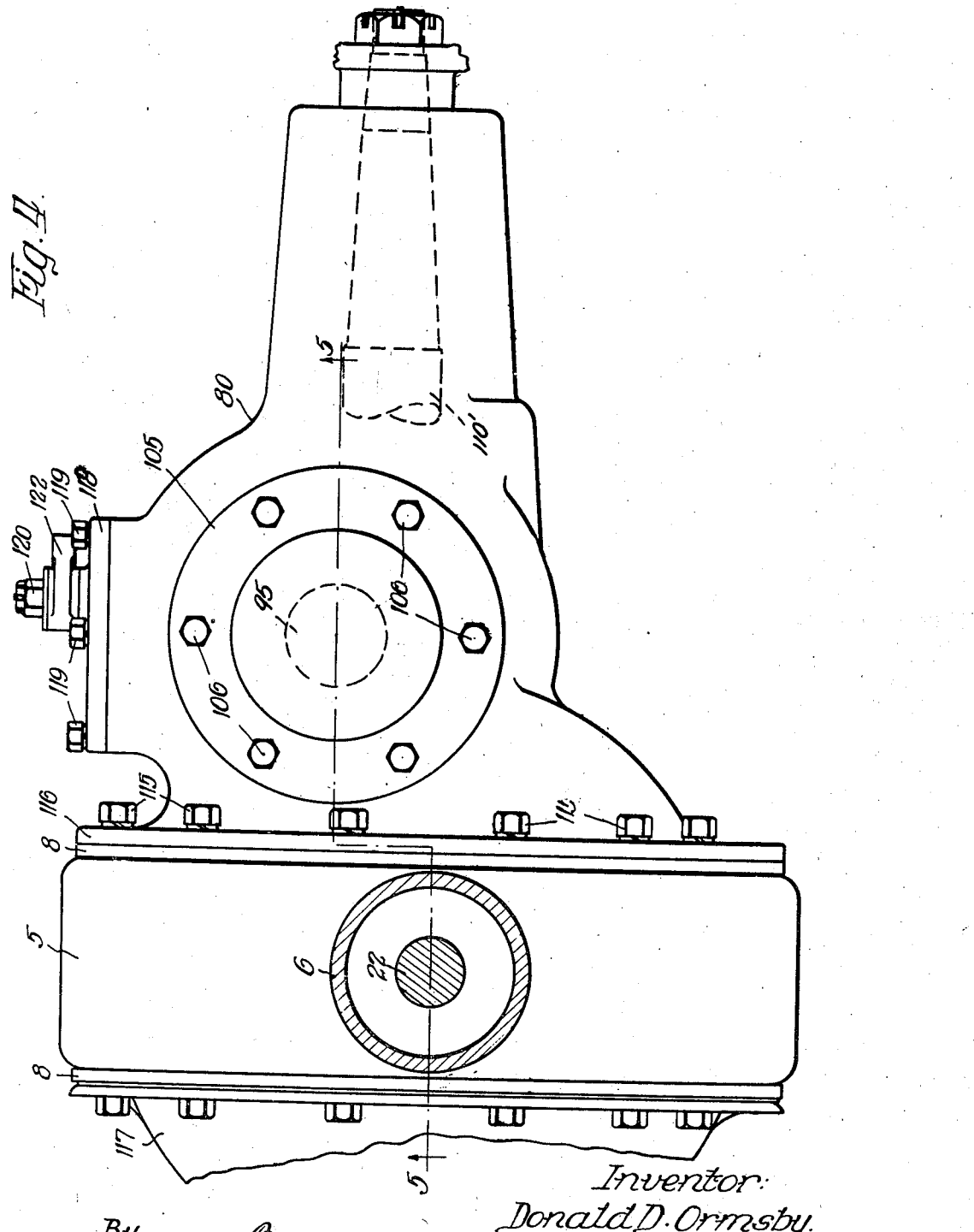

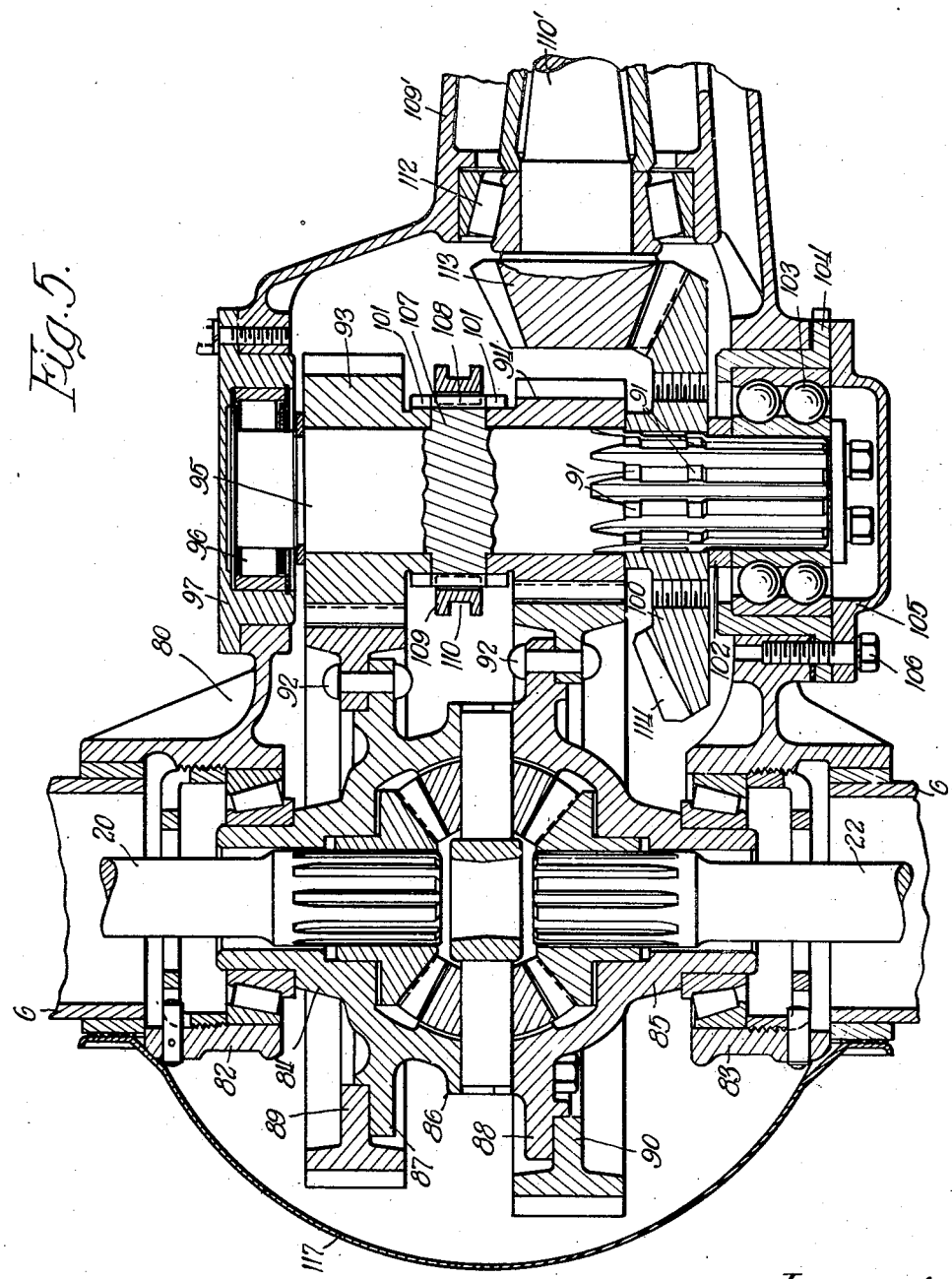

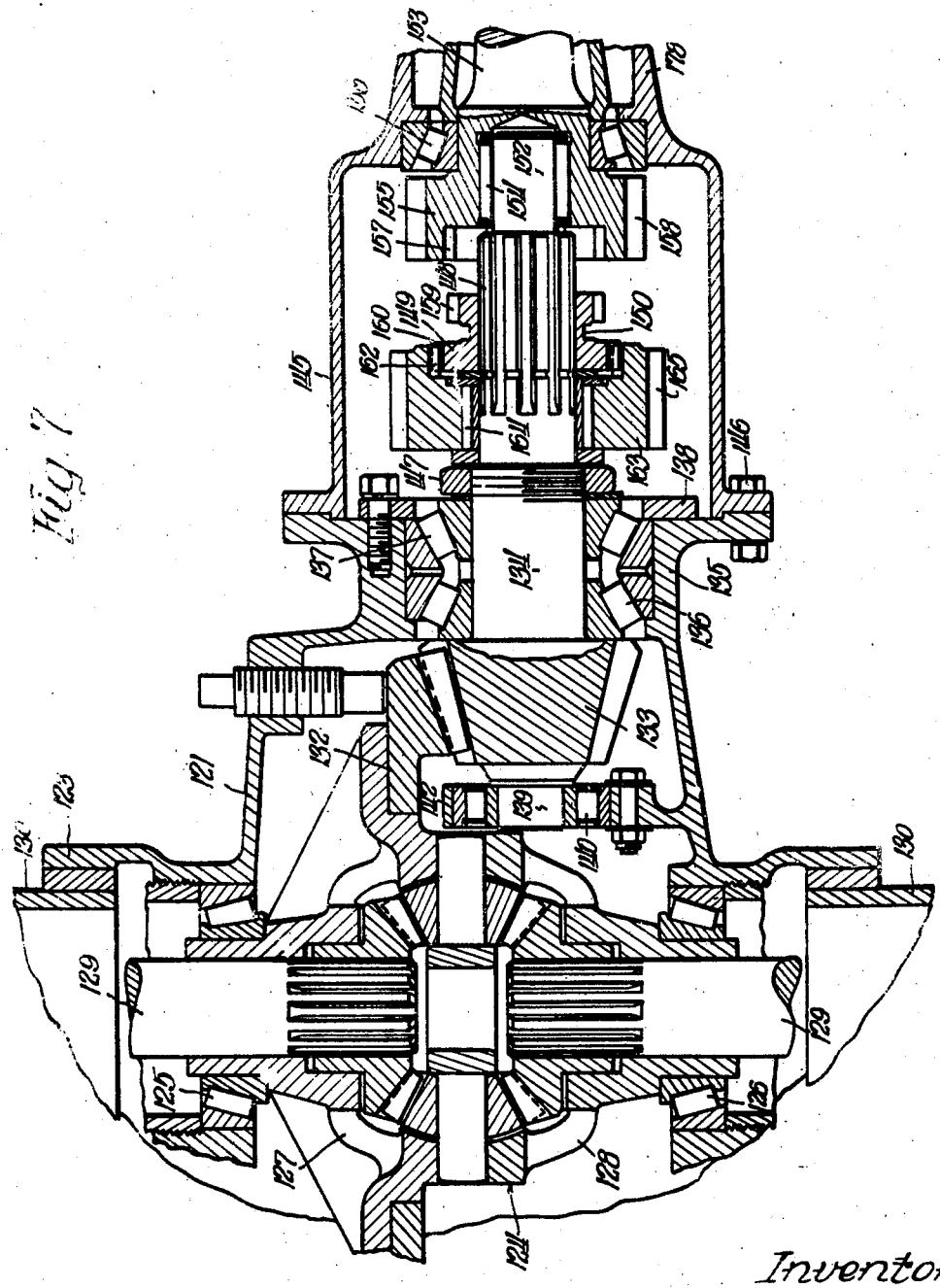

Nov. 21, 1939.  D. D. ORMSBY  2,180,962
DRIVE AXLE ASSEMBLY
Filed April 27, 1936  7 Sheets—Sheet 7

Inventor:
Donald D. Ormsby
By Brown Jackson Gottlieb Dennes
Attys.

Patented Nov. 21, 1939

2,180,962

UNITED STATES PATENT OFFICE 2,180,962

DRIVE AXLE ASSEMBLY

Donald D. Ormsby, Niles, Mich., assignor to Clark Equipment Company, Buchanan, Mich., a corporation of Michigan Application April 27, 1936, Serial No. 76,501

7 Claims. (Cl. 74—326)

This invention relates to drive axle assemblies, and more particularly is directed to the provision of a change speed single or double reduction drive from the propeller shaft of a vehicle to the driving axle, being a continuation in part of my copending application, Serial No. 69,032, filed March 16, 1936.

It has heretofore been known to provide for change of driving ratio between the drive shaft and the axle. This has been accomplished, in some cases, by a change speed transmission located at the axle, or by the use of a mechanism such as shown in the patent to Rockwell, No. 1,571,801, of February 7, 1926. Various other mechanisms have also been devised to attain this end. However, one of the underlying features of all such structures has been the reduction effected between a pinion on the drive shaft, and a bevel gear on the differential assembly or on an intermediate shaft. The axes of the pinion gear and the bevel gear, in all assemblies with which I am familiar, have been disposed in the same plane, since the tooth apices of these gears fall in a common center.

Such an arrangement is not entirely satisfactory, since if any change speed mechanism is incorporated therewith, the mechanism must be extended either vertically or horizontally. If vertical displacement is required, road clearance and body clearance form limiting factors preventing any great amount of vertical displacement with respect to the vertical limits of the differential casing on the axle housing. If horizontal displacement is required, the differential and change speed carrier has too great an overhang either forwardly or laterally with respect to the differential casing. In both cases the problems of clearance and proper support limit the assembly.

It has been found extremely desirable to make such a change speed reduction drive assembly of a size and configuration such that it is readily interchangeable with existing drives on vehicles now in use. This feature is not found in assemblies of the type with which I am familiar.

The primary object of the present invention is to provide a change speed single or double reduction drive of this type which overcomes the disadvantages inherent in prior assemblies.

One of the main features of the present invention is the incorporation of a reduction drive between the drive shaft and a bevel gear mounted on a normally extending shaft in which the apices of the gear teeth of the drive shaft do not lie in a center common to the apices of the bevel gear. More specifically, the present invention contemplates the use of a hypoid driving gear whose axis is offset with respect to any plane passing through the bevel gear axis.

The advantages derived by a construction of the type disclosed herein reside in the ability to design a more compact drive assembly, which has, for all practical purposes, a size such as not to interfere with any required clearance of the axle assembly, which can be readily substituted for the standard drive assemblies now in use without any material change in the relation of the parts, and which has no appreciable overhang requiring support other than on the axle housing.

Another feature of the present invention is the provision of a change speed mechanism interposed between the drive shaft and the axles, which will produce either a single or double reduction two speed axle. On connection with this change speed mechanism, I have found that it can be advantageously disposed between the drive shaft and the drive pinion, between the bevel gear and the differential assembly, or as an adjunct with the bevel gear for coupling this gear either directly to or in a change speed ratio to the differential assembly. In this latter case, only a single reduction is provided when the bevel gear is clutched directly to the differential assembly.

In this connection, I provide a novel shifting means whereby a single uni-directional movement of the shift lever will result in shifting from one driving ratio to another. In one form of the invention this shifting means comprises a novel form of shifter fork which successively declutches one set of gears and clutches a second set of gears, the shifter fork being in constant engagement with a shift collar associated with each set of gears. In other forms of the invention a clutch collar is shifted along a shaft to first declutch one gear from the shaft and subsequently clutch another gear thereto.

By the use of hypoid gears in the driving connection, the axis of this shaft can be offset with respect to any plane passing through the axis of the ring gear. Consequently the allowable clearance can be maintained even with the incorporation of an intermediate shaft spaced radially of the axles, so that the interposition of the change speed gears in this position will not decrease to any substantial extent the clearance which must be maintained. Thus with a driving connection employing hypoid gears, it is possible to provide a double reduction axle in which the intermediate change speed gearing can be mounted above the drive shaft and still be maintained within the peripheral limits of the differential carrier, without extending the length of the carrier. Also, with a single reduction axle, the same result is attained by dropping the drive shaft below the plane of the axle shafts, with the change speed gearing disposed thereabove and yet within the limitations of the differential carrier.

The present invention particularly is useful in providing for a simplified, compact, easily assembled and installed two speed single and double reduction axle drive which is supported in the same manner as the conventional type differential carrier from the flanged face of an axle housing.

Other objects and advantages of the present construction will appear more clearly from the following detailed description which, taken in conjunction with the accompanying drawings, will disclose to those skilled in the art the particular construction and operation of the illustrated forms of the present invention.

In the drawings:

Figure 3 is a section taken substantially on line 3—3 of Figure 1;

Figure 4 is a side elevational view of another form of the present invention;

Figure 5 is a sectional view taken substantially on line 5—5 of Figure 4;

Figure 7 is a sectional view taken substantially on line 7—7 of Figure 6; and

Figure 1:
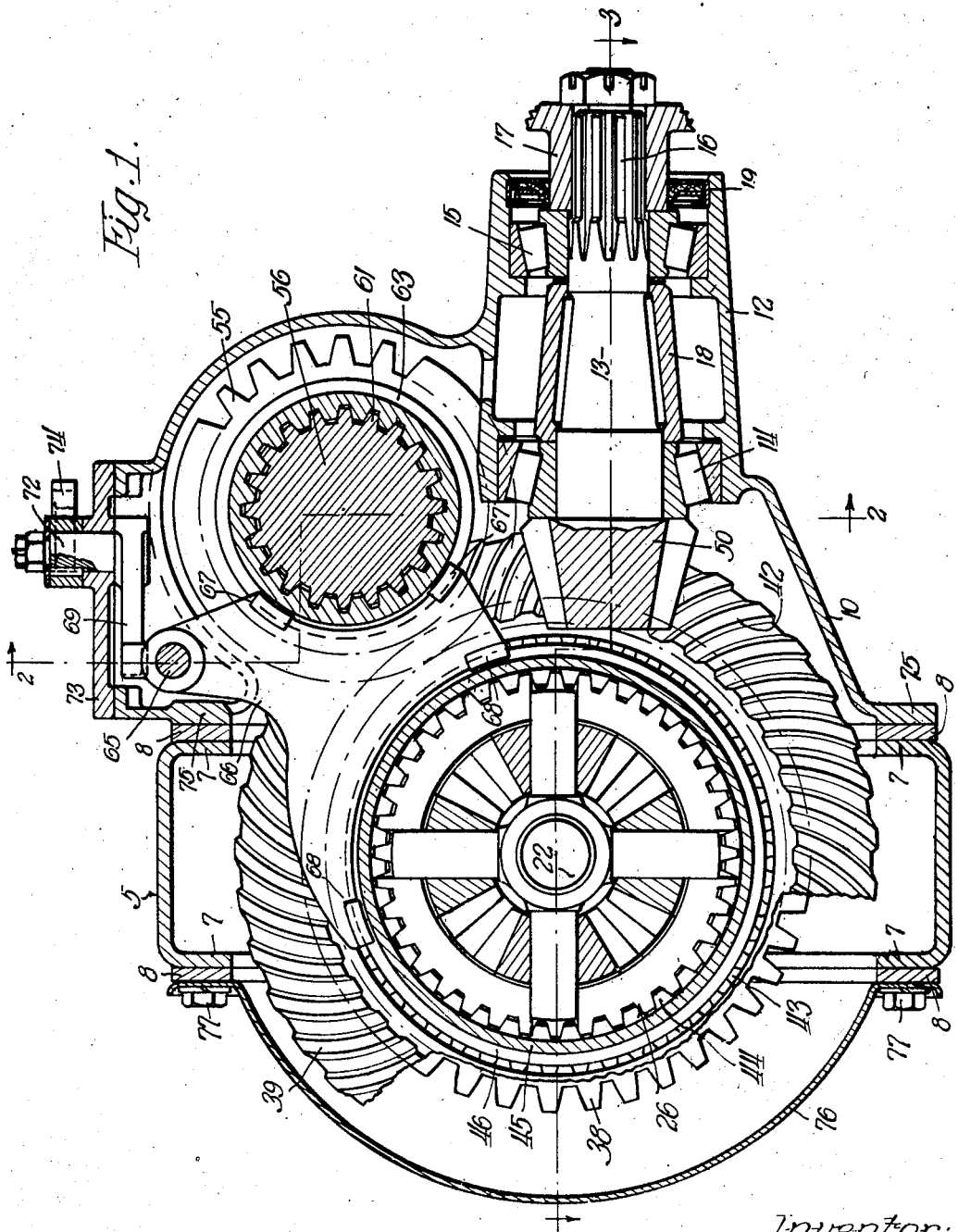
Figure 1 is a side elevational view of one form of the present invention.
Figure 2:
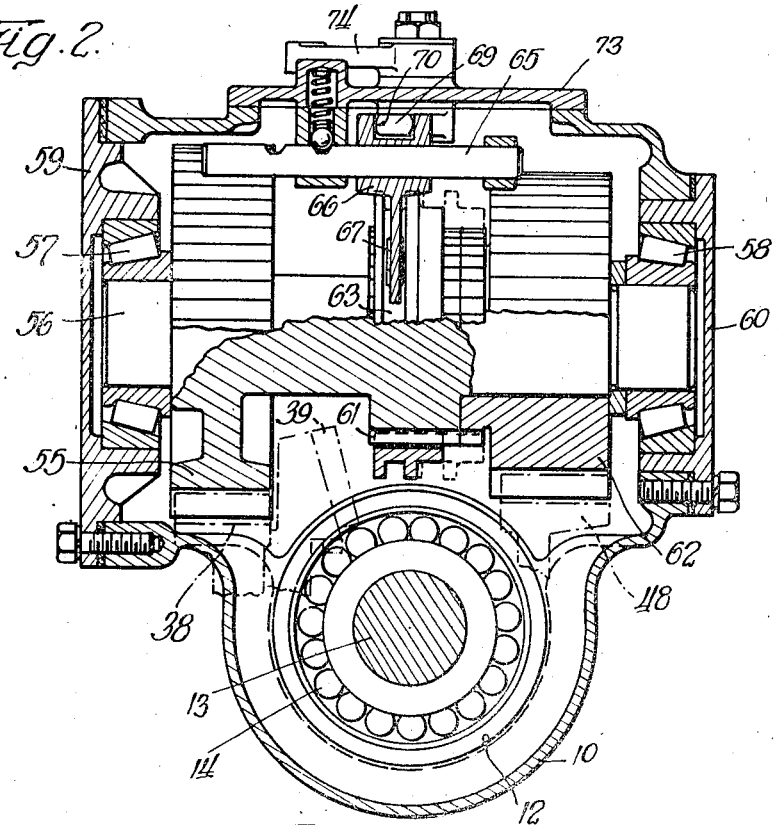
Figure 2 is a sectional view taken substantially on line 2—2 of Figure 1.

Referring now in detail to the form of the invention shown in Figures 1 to 3, inclusive, I have disclosed my invention as applied to the drive axle of an automotive vehicle or the like, which has an axle housing, indicated generally at 5, such as shown generally in the copending application of George Spatta, Serial No. 26,535, filed June 14, 1935, provided with tubular extending arms 6, the housing intermediate the arms 6 being formed into a circular banjo frame having radially inwardly flanged edges 7 reinforced with arcuate strips 8 welded or otherwise suitably secured thereto.

Mounted in the banjo opening of the housing 5 is a differential carrier 10 which has a forwardly extending nose portion 12 forming a suitable journal for a drive shaft 13 which extends therethrough, and which is supported by the bearings 14 and 15 for rotation within the nose portion of the carrier. At its outer end, the shaft 13 is splined, as at 16, to receive one element 17 of a universal coupling which joins the shaft 13 to the propeller shaft of the vehicle. A suitable annular spacer 18 is disposed between the bearings 14 and 15 about the shaft 13 and serves to maintain these bearings in spaced position. A suitable shaft seal 19 is provided at the outer end of the nose portion 12 of the carrier 10 to prevent leakage of lubricant outwardly of the shaft.

The tubular arm portions of the axle housing are adapted to receive the axle spindles 20 and 22 respectively, which at their inner ends are splined as at 23 and 24 to the side gears 25 within a differential casing 26 supported by inwardly extending journals 27 and 28 respectively of the differential carrier. The differential casing itself, so far as the drive from the casing to the axle spindles is concerned, may be of conventional design and need not be described in detail herein.

Each of the sections 29 and 30 of the casing is provided with projecting cylindrical portions 32 and 33 respectively, journaled in the bearings 34 and 35, the bearings 34 in turn, rotatably supporting the hub portion 36 of a gear 37 which is also rotatably supported by the bearings 31 mounted between an enlarged annular portion of the gear and the enlarged annular surface of the member 29.

The gear 37 is formed with the radially extending spiral tooth surface 38, and is also provided with the ring gear 39 bolted thereto by means of a plurality of bolts 40. The ring gear 39 has the beveled tooth surface 42 and an internal clutch tooth surface 43 disposed radially inwardly thereof. The casing member 29 is provided with an external clutch tooth surface 44 which is adapted to be directly clutched to the ring gear 39 by means of the clutch member 45 which is provided with an annular shifter groove 46 adapted to be engaged by any suitable shifting mechanism such as described in my copending application, Serial No. 64,035, filed February 15, 1936.

The opposite section 30 of the differential casing is provided with the radial flange 47 which has rigidly secured thereto the gear 48 having the radially extending spiral tooth surface 49.

The drive shaft 13 is provided at its inner end with the hypoid gear or pinion 50 which is adapted to have meshing engagement with a corresponding hypoid gear surface 42 of the ring gear 39 as will be noted in Figure 1. By reason of this construction, the center line of the drive shaft 13 can be dropped below the center line of the differential assembly and axle spindles in view of the fact that the apices of the teeth of the pinion 50 and the gear 42 are offset and do not fall in the same center. Thus the axis of the drive shaft is disposed out of any plane passing through the differential axis.

It will therefore be apparent that rotation of the drive shaft 13 will result in corresponding driving rotation of the ring gear 39 and gear 37 which is secured thereto by the bolts 40. The gear 37 is journaled for rotation by the bearings 52 in the journal 27 secured to the differential carrier 10 but is free to rotate with respect to the differential casing 26.

Thus, when the clutch member 45 is shifted out of clutching engagement between the clutch teeth 43 of the gear 39 and the clutch teeth 44 of the differential 26, the ring gear 39 and the gear 37 will have free rotation relative to the differential casing, and the gear 37 will in turn drive the gear 55 formed integral with the intermediate shaft 56 which is spaced radially from the differential casing and extends parallel to the axis of the axle spindles. By reason of the use of hypoid gears between the ring gear 39 and the drive shaft 13 allowing the axis of the drive shaft to be dropped downwardly, it is possible to mount the intermediate shaft 56 above the drive pinion 50 and yet substantially within the peripheral limits of the carrier.

Adjacent its opposite end, the shaft 56 is provided with a second gear 62 rotatably mounted thereon. Intermediate its ends the shaft 56 has clutch portion 61 thereon which carries a clutch collar 63 axially movable therealong. The collar 63, upon axial movement, is adapted to couple the shaft 56 and the gear 62 together for conjoint rotation, as shown in dotted lines in Figure 2. Suitably supported rearwardly of the shaft 56 is a shifter rod 65 which carries a shifter fork 66 thereon, the fork 66 having one arcuate yoke portion 67 adapted to have clutching engagement with the clutch collar 63 and having a second arcuate yoke portion 68 having clutching engagement in the groove 66 of the clutch collar 45. The shaft is moved axially by means of the shifter arm 69 engaging in a suitable recess 70 in the fork 66. The arm 69 is secured on the stud 72 which is rotatably supported in the top plate 73 closing the upper end of the differential carrier 10, the stud 72 at its outer projecting end being provided with an arm 74 which may be connected in any suitable manner to shifting mechanism located in the driver's cab of the vehicle.

The differential carrier 10 is provided with an annular radial flange portion 75 which is machined on its outer radial face to have seating engagement with the reinforcing rings 8 on the forward side of the banjo frame. Suitable bolts 77 may be employed for securing the carrier in fixed position on the foreward face of the banjo frame, certain of these bolts extending from the rear face of the banjo frame through the housing and threading into the flange 75, since the clearances are limited adjacent the upper portion of the flange due to the enlargement of the carrier necessitated by journalling of the intermediate shaft therein above the drive pinion 50. Similarly, a rear closure cap 76 of substantially semispherical form and preferably formed as a sheet metal stamping is secured about the rear face of the banjo frame by the bolts 77 to close the banjo frame and prevent escape of lubricant therefrom.

In the operation of the structure shown in Figures 1 to 3, the shifting yoke 67, which engages the shift collar 63, is positioned to hold this collar in position for coupling the shaft 56 and the gear 62 together. The yoke 68 is thereby positioned so that the clutch 45 is disengaged. Upon rotation of the drive shaft 13, the gear 50 then drives the ring gear 39 and rotation of the ring gear 39 is transmitted through the gear 37 to drive the gear 55. This effects rotation of the intermediate shaft 56 and corresponding rotation of the gear 62. The gear 62 has meshing engagement with the gear 48 which is rigidly coupled to the differential casing 26 and consequently drives the differential casing to effect corresponding drive of the axle spindles 20 and 22. It will be noted that in this driving arrangement, a first gear reduction is effected between the hypoid gears 50 and 39, and a second gear reduction is provided between the gear 62 and the gear 48 so that a double reduction two-speed drive is provided. When the shifter arm 69 is rotated, the shift collar 63 is declutched from the gear 62, and upon further movement clutches the shift collar 45 between the clutch teeth 44 and 43. This couples the ring gear 39 directly to the differential casing so that a single reduction drive is provided from the drive shaft. At the same time, since the gear 62 is now free to rotate on the intermediate shaft 56, this gear will have idling movement since it is in mesh with the gear 48 coupled to the differential casing.

It is thus apparent that a two-speed single and double reduction drive is provided by this construction which can be readily shifted to change the driving ratio by uni-directional movement of a shifter arm which successively declutches one set of driving gears and clutches a second set of driving gears, it of course being understood that a suitable clearance is provided so that the declutching operation is completed prior to initiation of the clutching operation.

Considering now the embodiment of the invention shown in Figures 4 and 5, I have provided the differential carrier 80 which is bolted or otherwise secured to the banjo frame of the axle housing, and which has inwardly extending bearing journals 82 and 83 journaling the opposite halves 84 and 85 of the differential casing for rotation within the banjo opening of the housing. The differential casing indicated generally at 86, is adapted to receive the splined ends of the axle spindles 20 and 22 and each of the portions 84 and 85 is provided with radially extending flanges 87 and 88 respectively to which are secured ring gears 89 and 90.

These gears are rigidly secured to the flanges by means of the rivets 92 and are adapted to have driving engagement with gears 93 and 94 respectively, mounted for free rotation on an intermediate shaft 95. The shaft 95 is supported at one end by suitable bearings 96 carried within the bearing cap 97, bolted to the side of the differential carrier 80, and at its opposite end is splined as at 99 to receive the ring gear 100 which is secured thereto and positioned by means of the spacer 102 carried on the reduced portion of the shaft and serving to hold the inner race of a double ball bearing assembly 103 in position. The bearing retaining plate 104 is mounted in the differential carrier 80 about the bearing assembly 103 and is held in position by the bearing cap 105 bolted to the face of the opening by means of the bolts 106. In order to secure concentric mounting of the ring gear 100 on the shaft 95, the splined portion 99 is provided with raised axially spaced splines 91 which are ground off smooth to provide seats for the hub of gear 100. This insures concentric mounting of the gear 100 on the shaft, and prevents cocking of the gear on the splines. At the same time the gear drives the shaft by splined engagement intermediate the raised seats.

Intermediate the gears 93 and 94, the shaft 95 is provided with an enlarged clutch portion 107 having the clutch teeth 108 thereon receiving the clutch collar 109. The clutch collar 109 is provided with an annular groove 110 adapted to receive any suitable type of shifting fork and is axially movable with respect to the shaft 95 to selectively clutch the gear 93 or the gear 94 for conjoint rotation with the shaft, each of the gears 93 and 94 having clutch portions 101 formed integral therewith.

The carrier 80 is provided with a forwardly extending nose portion 109' in which the drive shaft 110' is journaled, this shaft corresponding to the shaft 13 of the embodiment shown in Figures 1 to 3, and being suitably supported in bearings such as shown at 112. The inner end of the drive shaft 110' is provided with a hypoid pinion 113 which has driving engagement with the hypoid gear surface 114 of the ring gear 100.

It is therefore apparent that rotation of the drive shaft 110' results in drive engagement between the gears 113 and 100 to drive the intermediate shaft 95. This effects a first gear reduction. From the shaft 95, the drive is transmitted to the differential casing 86 through either the gear 93 or the gear 94, depending upon the position of the clutch collar 109. If the collar 93 is clutched to the shaft 95, the drive is from the shaft through the gears 93 and 89 to the differential casing, while if the gear 94 is clutched to the shaft, the drive is through the gears 94 and 90 to the differential casing. A second gear reduction is effected regardless of which of the gears 93 or 94 is coupled to the intermediate shaft while two driving ratios are provided due to the gear ratios between the gears 93 and 89 and the gears 94 and 90. I therefore provide a double reduction two-speed axle.

Considering now in detail the elevational view shown in Figure 4, it is apparent that by reason of the driving engagement between the drive shaft 110' and the intermediate shaft 95 through the hypoid gears, the axis of the drive shaft can be offset below the axis of the intermediate shaft, while still being disposed above the axis of the differential casing. This allows the intermediate shaft to be disposed in a lower position than would ordinarily be possible, and also allows the pinion to be moved closer to the differential casing. Thus, a reduction in both the vertical extent of the differential carrier and in the overall length of the carrier is effected as compared to constructions in which the axis of the drive shaft, the intermediate shaft and the differential casing are all disposed in the same plane.

The differential carrier 80 is bolted to the face of the banjo frame opening by a plurality of bolts 115 extending through the flange 116 of the carrier and threaded into suitably tapped openings in the banjo frame. A suitable closure plate 117 is secured to the rear face of the banjo opening by bolts in the manner described in connection with Figure 1, and the mechanism for shifting the clutch collar 109 is mounted on the top plate 118 secured by means of the bolts 119 to the carrier 80 above the intermediate shaft 95. This shift mechanism may comprise a shifter arm engageable in the groove 110 of the clutch collar, which arm is rotatably mounted on a stud 120 projecting through the top plate 118 and connected by an arm 122 to any suitable shifting mechanism in the manner described in Figures 1 to 3.

It will also be noted that the gear 93 has an external diameter not greater than the opening which receives the bearing cap 97, and thus may be removed from the intermediate shaft 95 for repair or replacement. Also, the entire shaft 95 with the gear 94 can also be removed through this opening, the gear 100 riding off of the splines 99 in such case and being removable outwardly of the rear face of the carrier after the differential casing has been removed. The bearings 96 and 103 are therefore easily accessible, and by removal of the shaft 95, the drive shaft pinion 113 is also accessible.

By reason of the construction shown in this embodiment of this invention, the two-speed double-reduction drive can be incorporated in a differential carrier which is of a size such that the vertical clearances remain substantially the same as with the conventional single-reduction single speed drive now employed. Also, the overall length of the carrier for the particular two-speed double-reduction drive can be reduced by reason of the hypoid driving engagement between the drive shaft and the intermediate shaft which allows the drive pinion to be disposed below the axis of the intermediate shaft and therefore, moved rearwardly with respect to the position which it would require if a normal spiral pinion and bevel gear arrangement were employed.

Figure 6:
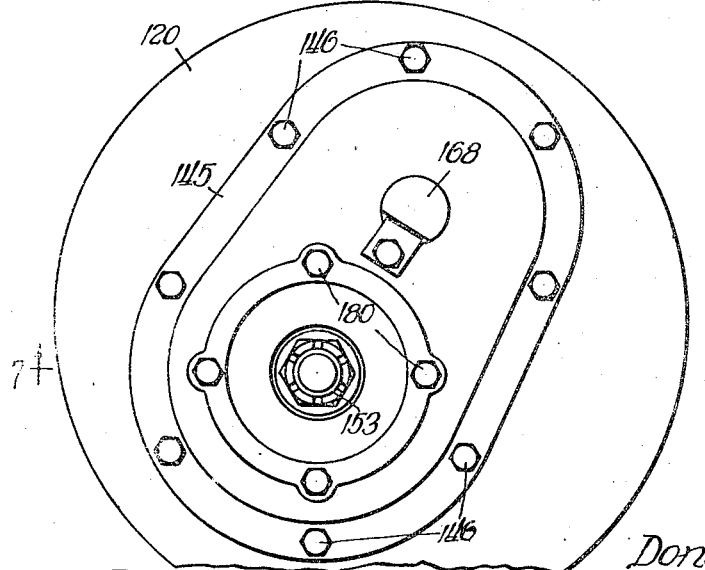
Figure 6 is an end elevational view of still another form of the present invention.
Figure 8:
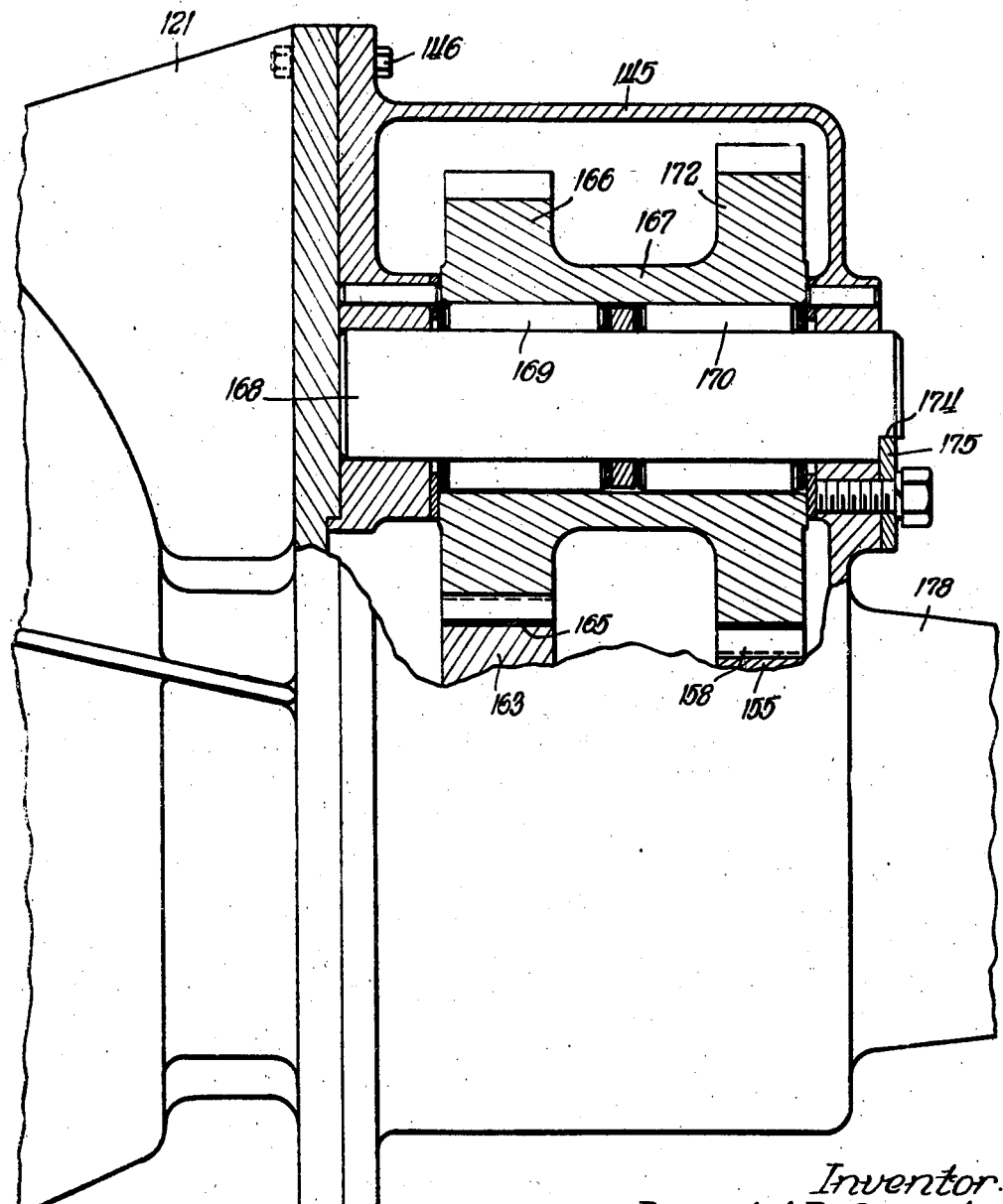
Figure 8 is a sectional view taken substantially on line 8—8 of Figure 7.

The construction shown in Figures 6 to 8 inclusive, employs the use of a hypoid drive between the drive shaft and the ring gear carried by the differential casing, but effects the change speed drive by the provision of different driving engagement between the propeller shaft and the drive pinion.

Considering now, the structure in detail, I have provided a differential carrier 121 which has a radial flange 123 having seating engagement about the periphery of the banjo opening and which carries suitable journals for supporting the differential casing, indicated generally at 124, rotatably on the carrier. Bearings 125 and 126 serve to rotatably support the two halves 127 and 128 of the differential assembly in the journals, and these portions 127 and 128 carry the drive axle spindles 129 extending in opposite directions through the housing arms 130. The portion 127 of the differential casing carries the ring gear 132 rigidly secured thereto, which gear has meshing engagement with the pinion 133 carried on the inner end of the quill shaft 134.

The differential carrier 121 is provided with a reduced portion 135 which has suitable bearings 136 and 137 therein, rotatably supporting the quill shaft for rotation. A bearing retaining ring 138 is bolted to the outer face of the carrier for maintaining the bearings in position. The inner end of the quill shaft 134 has a reduced stud portion 139 journaled in suitable bearings 140 supported in the journal 142 of the carrier.

Bolted to the outer face of the carrier 121 is a second housing 145 which, as shown in Figure 6, is offset upwardly and angularly, and is secured to an upwardly and angularly extending flange face on the carrier 121 by means of a plurality of bolts 146. The quill shaft 134 is secured against movement axially by means of the threaded nut 147 which engages the shaft outwardly of the bearings 137. The shaft is then reduced in section and splined as indicated at 148 to receive the axially slidable clutch collar 149 which is provided with the annular groove 150 adapted to receive the shifter yoke. Outwardly of the splined portion 148, the shaft 134 has a reduced projecting stud 152 which is rotatably mounted within a recess in the drive shaft 153 by means of the bearings 154.

The drive shaft 153 is provided with an enlarged end portion forming the gear 155, and is journaled for rotation with respect to the housing 145 by the bearings 156. The gear 155 is provided with an internal gear or clutch portion 157 and with the radially extending external gear portion 158. When the clutch collar 149 is moved axially so that the clutch teeth 159 thereof engage the clutch portion 157 of the drive shaft 153, the gear shaft 134 is coupled directly to the drive shaft 153 for direct driving engagement and a single reduction drive from the drive shaft 153 to the differential casing 124 is provided. In its opposite position, the clutch collar 149 has the clutch tooth portion 160 thereof coupled to the internal clutch teeth 162 of a gear 163 which is rotatably supported on the shaft 134 by the bearing 164. The gear 163 has the external gear portion 165 which has meshing engagement with the portion 166 of a compound gear 167 mounted for free rotation on the stub shaft 168 journaled in the upper part of the housing 145, as shown in detail in Figure 8. The compound gear 167 is provided with the internal bearing portions 169 and 170 which are mounted for free rotative movement about the shaft 168, and the second gear portion 172 thereof has meshing engagement with the gear portion 158 of the gear 155. Therefore, with the clutch in the position shown in Figure 7, driving engagement is effected from the drive shaft 153 through the gear portions 158 and 172 and thence through the gear portions 166 and 165 to the quill shaft through the splined connection between the clutch collar 149 and this shaft. In this position, a different driving ratio is effected from the drive shaft to the quill shaft and consequently, this construction provides a two-speed axle drive which in one speed has a single reduction drive and in a second speed has a double reduction drive.

The shaft 168 projects outwardly of the housing 145 and its outer projecting portion is slabbed off as indicated at 174 and engaged by suitable stop member 175 for holding it against rotation and in fixed position within the housing 145. A nose portion 178 is formed integral with the housing 145, as shown in Figure 8, and carries suitable bearings for journalling the drive shaft 153 for rotation.

It will be apparent that a uni-directional shifting movement of the shift yoke engaged in the groove 150 of the clutch collar 149 will produce a shift in the drive ratio from direct drive to the drive shaft pinion into a changed speed drive to this pinion.

It is necessary that the stub shaft 168 must be spaced radially from the quill shaft 134, but it is required that this spacing be such as to maintain the enclosing housing 145 within the peripheral limits of the flange 123 of the differential carrier 121. In order to accomplish this result, I employ a hypoid gear driving connection between the pinion 133 and the ring gear 132. This allows the axis of the quill shaft 134 to be disposed below a horizontal plane passing through the axis of the differential allowing the shaft to be dropped a sufficient distance so that the stub shaft 168 and the compound gear 167 which is mounted thereon can be positioned within a housing which will not extend beyond the peripheral limits of the banjo frame. This maintains the clearance of the differential carrier within the limits of the conventional design and yet allows a single and double-reduction two-speed drive to be provided. It is to be noted that the differential assembly in this case is of substantially conventional design except for the provision of a hypoid ring gear 132 in place of the spiral bevel gear ordinarily employed.

It is therefore apparent that I have provided a drive axle construction for producing a two-speed single or double-reduction drive which can be assembled within a differential carrier that will not exceed the peripheral limits of the differential carriers now in use, and which will not produce an objectionable extension of the length of the carrier. This result is achieved by the use of the hypoid driving connection between the drive pinion and the ring gear which allows the axis of the drive pinion to be disposed out of any plane passing through the axis of the differential assembly. As a result, the drive shaft axis can be disposed either above or below a horizontal plane passing through the differential, and the intermediate shaft can be spaced radially from the differential a distance such as to provide for proper gear ratios and tooth pressures under full torque load without increasing the clearance required for the differential carrier.

The construction is distinctly advantageous in providing for simplified assembling of the various component parts, their ready inspection, repair and replacement, and the provision of a structure which can be readily interchanged for the conventional drive assembly now in use while still maintaining all the required clearances.

It is also possible by reason of the present construction, to employ a shifting means, which in a single movement will first declutch one driving connection and then pass through neutral into position to effect a second driving connection whereby shifting is easily and quickly accomplished without any possibility of clashing of the gears.

The present invention has been shown in only several of its possible embodiments and I do not intend to be limited only to the constructions shown and described since the principles involved therein can be equally well applied to other forms of construction. The invention is therefore to be limited only as defined by the scope and spirit of the appended claims.

I claim:

1. In combination, a drive shaft, a differential disposed for rotation about the axis normal thereto, the axis of the drive shaft being disposed above the horizontal plane through the differential axis, an intermediate shaft disposed above and normal to the axis of the drive shaft, intermeshing hypoid gear means on said shafts, and means on said intermediate shaft and said differential for selectively varying the driving ratio between said intermediate shaft and said differential, the distance from the point of meshing engagement of said hypoid gear means to the differential axis being substantially less than the sum of the distances from said point to the axis of said intermediate shaft and from said last-named axis to said differential axis.

2. In combination, a banjo type axle housing construction, a differential case having spaced coaxial gears, a lay shaft extending parallel to and radially spaced from said case and having correspondingly spaced gears freely rotatable thereon, clutch means on said shaft between said last-named gears and axially shiftable for selectively clutching said gears for conjoint rotation with said shaft, the axis of said lay shaft being disposed above a horizontal plane through said case, a ring gear on said shaft, a pinion gear engaging said ring gear for driving said shaft, said pinion gear having its axis offset with respect to the axis of said lay shaft and lying in a horizontal plane, intermediate horizontal planes through said differential and said lay shaft axes, and a carrier for said lay shaft and said case, said carrier forming a journal for said drive shaft, said carrier being of a vertical extent not exceeding that of the banjo portion and having a forward overhang materially less than that possible with said axes and differential lying in coplanar relationship.

3. In combination, a banjo type axle housing, a drive shaft adapted to be driven from a conventional change speed transmission, a differential carrier mounted on the banjo frame of said housing and receiving one end of said drive shaft, a differential case journalled in said carrier and having its axis offset vertically from the horizontal plane through the axis of said drive shaft, an intermediate shaft journalled in said carrier and extending parallel to the axis of said case, said intermediate shaft being fixed against axial movement and disposed in a horizontal plane above said plane through said drive shaft axis, hypoid gear means driven by said drive shaft for rotating said intermediate shaft, and reduction gear means between said intermediate shaft and said case, and selectively clutched to said intermediate shaft for transmitting driving torque to said case, all said gear means being disposed within the vertical extent of said banjo frame, and the axes of said differential case and said intermediate shaft defining, with the point of meshing engagement of said hypoid gear means, a triangle, no side of which lies in a horizontal plane.

4. In a double reduction two speed rear axle construction adapted to be supported on the defining flange of the banjo frame of a rear axle housing, a differential carrier secured to said flange and disposed within the vertical limits thereof, a differential case journalled in said carrier within said frame, an intermediate shaft journalled for rotation in said carrier and disposed in a horizontal plane above the horizontal plane of said differential case, a drive shaft extending into the opposite end of said carrier and disposed in a horizontal plane below said plane of said intermediate shaft, gear means between said intermediate shaft and said case, and hypoid gear means between said drive shaft and said intermediate shafts, the axes of said shafts and differential being arranged so that the overall length of said carrier is materially reduced over that attainable when said axes are coplanar whereby said carrier does not project above or below said banjo frame and has a relatively short overhang.

5. In a double reduction two speed axle construction, the combination with a rear axle housing including a central banjo frame, of a differential carrier containing a differential case journalled therein and an intermediate shaft parallel to said case and journalled in said carrier, gear means selectively clutched for driving engagement between said shaft and case, a drive shaft extending into said carrier with its axis normal to and below said intermediate shaft and hypoid driving gear means on said drive shaft for transmitting torque to said intermediate shaft, the carrier being bolted to the defining face of said frame and disposed within the projected peripheral limits thereof and the axes of said shafts and case lying in different horizontal planes whereby said carrier has relatively short overhang with respect to said housing.

6. In a double reduction two speed rear axle construction, the combination, with an axle housing of the central circular banjo frame type having a defining carrier-receiving flange, of a differential carrier of a vertical extent not exceeding the diameter of said flange secured to said flange and including a differential case journalled therein within said frame, a lay shaft in said carrier parallel to said case, a drive shaft extending into the forwardly projecting end of said carrier, and gear means for effecting selective speed reductions to said case from said drive shaft including a hypoid gear on said drive shaft, the axes of each of said shafts and case lying in different horizontal planes whereby the forward overhang of said carrier with respect to said housing does not exceed the normal overhang of a conventional single reduction axle construction employing straight bevel gears.

7. In a two speed axle assembly, a banjo type axle housing, a differential carrier bolted to one face of the banjo frame and having a differential therein, a drive shaft extending into one end of said carrier having a pinion and disposed in a horizontal plane above the horizontal plane through the axis of the differential, an intermediate shaft journaled in said carrier between the drive shaft and differential and having its axis lying above said planes, a pair of gears secured to the differential in axially spaced relation, freely rotatable gears on said intermediate shaft in constant meshing engagement with said differential, clutch means on said intermediate shaft between said freely rotatable gears for selectively clutching each gear to said shaft, a hypoid ring gear driven by said pinion and keyed to said intermediate shaft at one side of both sets of constant mesh gears, the assembly being so constructed and arranged that the ring gear extends radially within the cylindrical projection of said differential gears whereby the overall length of said carrier is materially reduced over that attainable when the axes of said shafts and differential are in the same plane, and the vertical extent of the carrier lies within the vertical extent of the banjo frame.

DONALD D. ORMSBY.